United States Patent
Wevers et al.

(10) Patent No.: US 11,945,194 B2
(45) Date of Patent: Apr. 2, 2024

(54) MULTILAYER FILMS AND LAMINATES CONTAINING SLIP AGENTS

(71) Applicants: Dow Global Technologies LLC, Midland, MI (US); Rohm and Haas Company, Collegeville, PA (US)

(72) Inventors: Ronald Wevers, Terneuzen (NL); Raul Sharma, Lake Jackson, TX (US); Kyle E. Hart, Lake Jackson, TX (US); Mridula Kapur, Lake Jackson, TX (US); Michaeleen L. Pacholski, Collegeville, PA (US)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 515 days.

(21) Appl. No.: 17/312,289

(22) PCT Filed: Dec. 10, 2019

(86) PCT No.: PCT/US2019/065496
§ 371 (c)(1),
(2) Date: Jun. 9, 2021

(87) PCT Pub. No.: WO2020/123520
PCT Pub. Date: Jun. 18, 2020

(65) Prior Publication Data
US 2022/0105712 A1 Apr. 7, 2022

Related U.S. Application Data

(60) Provisional application No. 62/779,875, filed on Dec. 14, 2018.

(51) Int. Cl.
| | |
|---|---|
| *B32B 27/08* | (2006.01) |
| *B32B 7/12* | (2006.01) |
| *B32B 27/16* | (2006.01) |
| *B32B 27/32* | (2006.01) |
| *B32B 27/36* | (2006.01) |
| *C08J 5/18* | (2006.01) |
| *C08K 5/20* | (2006.01) |

(52) U.S. Cl.
CPC ............ *B32B 27/08* (2013.01); *B32B 7/12* (2013.01); *B32B 27/16* (2013.01); *B32B 27/32* (2013.01); *B32B 27/36* (2013.01); *C08J 5/18* (2013.01); *C08K 5/20* (2013.01); *B32B 2250/24* (2013.01); *B32B 2307/31* (2013.01); *B32B 2307/72* (2013.01); *B32B 2307/732* (2013.01); *B32B 2307/746* (2013.01); *B32B 2553/00* (2013.01); *C08J 2323/04* (2013.01); *C08J 2423/04* (2013.01); *C08K 2201/014* (2013.01)

(58) Field of Classification Search
None
See application file for complete search history.

(56) References Cited

U.S. PATENT DOCUMENTS

| | | | | |
|---|---|---|---|---|
| 6,846,863 | B2 * | 1/2005 | Plume | C08K 5/20 |
| | | | | 524/229 |
| 2008/0154053 | A1 * | 6/2008 | Erhan | C07C 67/26 |
| | | | | 554/213 |
| 2010/0075079 | A1 * | 3/2010 | Bernal-Lara | C08L 23/142 |
| | | | | 526/348 |
| 2012/0101201 | A1 * | 4/2012 | Townsend | C07C 233/05 |
| | | | | 554/35 |

FOREIGN PATENT DOCUMENTS

| | | | | | |
|---|---|---|---|---|---|
| JP | S48/13935 | | * | 5/1973 | ............... C08K 5/17 |
| WO | 2017/097364 | A1 | | 6/2017 | |
| WO | WO 2017/097364 | | * | 6/2017 | ............. B65D 41/04 |
| WO | 2018/223357 | A1 | | 12/2018 | |
| WO | WO 2018/223357 | | * | 12/2018 | ............. B32B 27/30 |

OTHER PUBLICATIONS

JP S48-13935 B1—MT—polyethylene w—slip agent—1973 (Year: 1973).*
Bahrs—WO 2017-097364 A1—PCT D2—MT—lubricant for sealing insert—2017 (Year: 2017).*

* cited by examiner

*Primary Examiner* — John Vincent Lawler
(74) *Attorney, Agent, or Firm* — Boyle Fredrickson S.C.

(57) ABSTRACT

The present disclosure provides a multilayer film. The multilayer film includes at least two layers including a sealant layer and a second layer in contact with the sealant layer. The sealant layer contains (A) a first ethylene-based polymer having a density from 0.895 g/cc to 0.925 g/cc and a melt index from 0.5 g/10 min to 30 g/10 min; (B) a branched fatty acid amide; and (C) a linear saturated fatty acid amide, wherein the branched fatty acid amide and the linear saturated fatty acid amide have a weight ratio of from 1:5 to 3:1. The second layer contains a second ethylene-based polymer.

14 Claims, No Drawings

MULTILAYER FILMS AND LAMINATES CONTAINING SLIP AGENTS

BACKGROUND

The present disclosure relates to multilayer films and laminates having a sealant layer containing an ethylene-based composition including slip agents.

Film layers formed from ethylene-based polymers are used in multilayer films for a variety of applications, including, for example, food packaging and specialty packaging. An ethylene-based polymer film surface layer requires a low coefficient of friction (COF) (e.g., less than 0.25) for efficient processing of the films, such as in a fabrication line or a packaging line. To achieve a low COF, slip agents are typically added to the ethylene-based polymer surface layer, which may be a sealant layer. Conventional slip agents include unsaturated fatty acid amides such as erucamide and oleamide, which are known to lower a film's COF by migrating to the surface of the film. However, it is difficult to maintain a consistent low COF using conventional migratory slip agents under different environmental conditions, such as time, elevated temperature, elevated pressure, and various converting processes. Non-migratory slip agents such as silicones have also been added to the ethylene-based polymer outer layer, but they are known to be less effective at achieving a low COF (e.g., less than 0.20). Additionally, non-migratory slip agents are more expensive than migratory slip agents.

The art recognizes the need for a film that includes an ethylene-based polymeric layer that exhibits a low COF (e.g., less than 0.25) without a non-migratory slip agent. The art also recognizes the need for a laminate that includes an ethylene-based polymeric layer that exhibits a low COF (e.g., less than 0.25) without a non-migratory slip agent.

SUMMARY

The present disclosure provides a multilayer film. The multilayer film includes at least two layers including a sealant layer and a second layer in contact with the sealant layer. The sealant layer contains (A) a first ethylene-based polymer having a density from 0.895 g/cc to 0.925 g/cc and a melt index from 0.5 g/10 min to 30 g/10 min; (B) a branched fatty acid amide; and (C) a linear saturated fatty acid amide, wherein the branched fatty acid amide and the linear saturated fatty acid amide have a weight ratio of from 1:5 to 3:1. The second layer contains a second ethylene-based polymer.

The present disclosure also provides a laminate. The laminate includes a first film and a second film, wherein the first film is laminated to the second film. The first film includes a sealant layer containing (A) a first ethylene-based polymer having a density from 0.895 g/cc to 0.925 g/cc and a melt index from 0.5 g/10 min to 30 g/10 min; (B) a branched fatty acid amide; and (C) a linear saturated fatty acid amide, wherein the branched fatty acid amide and the linear saturated fatty acid amide have a weight ratio of from 1:5 to 3:1.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl" (or "alkyl moiety"), as described herein, refers to an organic radical derived from an aliphatic hydrocarbon by deleting one hydrogen atom therefrom. An alkyl moiety may be linear, branched, cyclic or a combination thereof.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as a Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.855 g/cc, or 0.860 g/cc, or 0.875 g/cc, or 0.870 g/cc, or 0.880 g/cc, or 0.890 g/cc, or 0.895 g/cc to 0.900 g/cc, or 0.902 g/cc, or 0.904 g/cc, or 0.909 g/cc, or 0.910 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

A "fatty acid" is a carboxylic acid having a hydrocarbon chain and a terminal carboxyl group. The fatty acid may contain more than one carboxyl group (e.g., a dicarboxyl fatty acid that contains two carboxyl groups).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

A "hydrocarbon" is a compound that contains only hydrogen and carbon atoms. The hydrocarbon can be (i) branched or unbranched, (ii) saturated or unsaturated (iii) cyclic or acyclic, and (iv) any combination of (i)-(iii). Nonlimiting examples of hydrocarbons include alkanes, alkenes, and alkynes.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins (available form The Dow Chemical Company) and FLEXOMER™ VLDPE resins (available from The Dow Chemical Company).

Test Methods

Density is measured in accordance with ASTM D792, Method B. The result is recorded in grams per cubic centimeter (g/cc).

Linear unsaturated fatty acid amide (e.g., erucamide) content in the sealant layer containing ethylene-based polymer is measured in accordance with ASTM D6953 using Liquid Chromatography. The result is reported in parts per million (ppm) or weight percent (wt %).

Melt index (MI) (12) in g/10 min is measured using ASTM D-1238-04 (190° C./2.16 kg).

Coefficient of Friction

Coefficient of Friction (COF) is measured according to ASTM D1894.

Multilayer film is produced as a roll. The "Pre-lamination COF" is measured after the film roll is stored for 1 week at ambient conditions (25° C., 101.325 kPa, 50-60% relative humidity).

"Laminate 60° C. Aged COF" is measured on a laminate structure after curing at ambient conditions (25° C., 101.325 kPa, 50-60% relative humidity) for 7 days, and then heating the laminate structure for 7 days at 60° C.

Two types of pieces are cut from each sample multilayer film roll and laminate structure for COF testing: (i) 3.5 inch×3.5 inch (8.89 cm×8.89 cm) squares (the "square piece") and (ii) 6.0 inch×12.0 inch strips (with the long side along the machine direction, MD) (the "strip piece").

Kinetic film-to-metal COF is measured on a TMI COF Tester, Model 32-06-00-0002, with standard testing conditions (23° C. (±2° C.) and 50% (±10%) relative humidity).

A B-type sled is used, the sled being 2.5 inch×2.5 inch (6.35 cm×6.35 cm) and weighing 200 g. The square piece is placed on the bottom of the sled such that the side of interest is facing out, and with the MD parallel to the direction of movement. The square piece is attached to the sled on the forward and backward edges of the sled using double-sided tape, ensuring there are no wrinkles on the specimen. The strip piece is attached to the frame testing surface with the side of interest facing out and with the long side in the machine direction. This strip piece is gripped on the machine at one end on the short side, this end being opposite from the direction of travel of the sled. The sled is then placed specimen-face down on the testing frame and attached to a travel arm that contains a load cell (which measures frictional force). The sled is moved over the strip piece at a speed of 6 in/minute (15.24 cm/min) for a distance of 3 inches (7.62 cm). The average load over the 3 inches (7.62 cm) of movement is the kinetic force ($F_k$). The coefficient of kinetic friction ($\mu_K$) (COF) is the ratio of the kinetic force ($F_k$) to the normal force (W), wherein the normal force (W) is the weight of the sled (200 g). Five replicate samples are tested, and the average value is reported.

DETAILED DESCRIPTION

The present disclosure provides a multilayer film. The multilayer film has at least two layers, including a sealant layer and a second layer in contact with the sealant layer. The sealant layer contains (A) a first ethylene-based polymer having a density from 0.895 g/cc to 0.925 g/cc and a melt index from 0.5 g/10 min to 30 g/10 min; (B) a branched fatty acid amide; and (C) a linear saturated fatty acid amide. The branched fatty acid amide and the linear saturated fatty acid amide have a weight ratio of from 1:5 to 3:1. The second layer contains a second ethylene-based polymer.

The multilayer film contains two layers, or more than two layers. For example, the multilayer film can have two, three, four, five, six, seven, eight, nine, ten, eleven, or more layers. In an embodiment, the multilayer film contains only two layers, or only three layers.

1. Sealant Layer

The multilayer film contains a sealant layer. The sealant layer contains (A) a first ethylene-based polymer having a density from 0.895 g/cc to 0.925 g/cc and a melt index from 0.5 g/10 min to 30 g/10 min; (B) a branched fatty acid amide; and (C) a linear saturated fatty acid amide; and (D) optionally, an additive. The branched fatty acid amide and the linear saturated fatty acid amide have a weight ratio of from 1:5 to 3:1.

The sealant layer has two opposing surfaces. In an embodiment, the sealant layer is a continuous layer with two opposing surfaces.

A. First Ethylene-Based Polymer

The sealant layer contains a first ethylene-based polymer. The ethylene-based polymer has a density from 0.895 g/cc to 0.925 g/cc and a melt index from 0.5 g/10 min to 30 g/10 min. Nonlimiting examples of suitable ethylene-based polymer include LDPE and linear polyethylene. Nonlimiting examples of linear polyethylene include LLDPE, ULDPE, VLDPE, EPE, ethylene/α-olefin multi-block copolymers (also known as OBC), m-LLDPE, substantially linear, or linear, plastomers/elastomers, and combinations thereof. Nonlimiting examples of suitable ethylene-based polymer also include ethylene/α-olefin interpolymer and ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene-based polymer is an ethylene/1-octene interpolymer.

In an embodiment, the ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene; and a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene-based polymer.

The ethylene-based polymer has a density from 0.895 g/cc, or 0.900 g/cc, or 0.905 g/cc, or 0.910 g/cc, or 0.915 g/cc, or 0.920 g/cc to 0.925 g/cc. In an embodiment, the ethylene-based polymer has a density from 0.895 g/cc to 0.920 g/cc, or from 0.900 g/cc to 0.920 g/cc, or from 0.910 g/cc to 0.925 g/cc, or from 0.915 g/cc to 0.920 g/cc, or from 0.920 g/cc to 0.925 g/cc.

The ethylene-based polymer has a melt index from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min, or 10 g/10 min, or 15 g/10 min, or 20 g/10 min, or 25 g/10 min, or 30 g/10 min. In an embodiment, the ethylene-based polymer has a melt index from 0.5 g/10 min to 20 g/10 min, or from 0.5 g/10 min to 10 g/10 min, or from 0.5 g/10 min to 5 g/10 min, or from 0.5 g/10 min to 2 g/10 min, or from 0.5 g/10 min to 1.0 g/10 min.

In an embodiment, the ethylene-based polymer is a LLDPE. The LLDPE is an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. In an embodiment, the LLDPE has density from 0.910 g/cc, or 0.915 g/cc, or 0.920 g/cc to 0.925 g/cc; and a melt index from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min, or 10 g/10 min, or 15 g/10 min, or 20 g/10 min, or 25 g/10 min, or 30 g/10 min. In an embodiment, the ethylene-based polymer is a LLDPE that is an ethylene/1-octene copolymer. In another embodiment, the LLDPE that is an ethylene/1-octene copolymer has a density from 0.910 g/cc to 0.920 g/cc and a melt index from 0.5 g/10 min to 5 g/10 min.

In an embodiment, the ethylene-based polymer is a LDPE. The LDPE is an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. In an embodiment, the LDPE has density from 0.915 g/cc, 0.916 g/cc to 0.918 g/cc, or 0.920 g/cc, or 0.925 g/cc; and a melt index from 0.5 g/10 min, or 1.0 g/10 min, or 1.5 g/10 min, or 2.0 g/10 min, or 3.0 g/10 min, or 4.0 g/10 min, or 5.0 g/10 min, or 8.0 g/10 min to 10 g/10 min, or 11 g/10 min, or 15 g/10 min, or 20 g/10 min, or 25 g/10 min, or 30 g/10 min. In an embodiment, the LDPE has a density from 0.915 g/cc to 0.920 g/cc, or from 0.916 g/cc to 0.918 g/cc; and a melt index from 5 g/10 min to 20/10 min, or from 10 g/10 min to 20/10 min.

The sealant layer may contain more than one ethylene-based polymer. In an embodiment, the sealant layer includes at least two ethylene-based polymers, wherein each ethylene-based polymer differs from one another compositionally, structurally, and/or physically. For example, the sealant layer may contain an LLDPE and a LDPE.

In an embodiment, the sealant layer contains from 70 wt %, or 75 wt %, or 80 wt %, or 85 wt %, or 90 wt % to 93 wt %, or 94 wt %, or 95 wt %, or 98 wt %, or 99 wt %, or 99.5 wt %, or 99.7 wt %, or 99.99 wt % ethylene-based polymer, based on the total weight of the sealant layer. In another embodiment, the sealant layer contains from 94 wt %, or 95 wt %, or 99 wt % to 99.99 wt % ethylene-based polymer, based on the total weight of the sealant layer. In another embodiment, the sealant layer contains from 98 wt % to 99.99 wt %, or from 99 wt % to 99.99 wt %, or from 99 wt % to 99.7 wt % ethylene-based polymer, based on the total weight of the sealant layer.

In an embodiment, the ethylene-based polymer is selected from LLDPE, LDPE, and combinations thereof. The sealant layer contains from 85 wt %, or 90 wt %, or 92 wt % to 93 wt %, or 94 wt %, or 95 wt %, or 96 wt %, or 97 wt % LLDPE; and from 1 wt %, or 2 wt %, or 3 wt % to 4 wt %, or 5 wt %, or 6 wt %, or 7 wt %, or 8 wt %, or 9 wt %, or 10 wt % LDPE, based on the total weight of the sealant layer.

The ethylene-based polymer may comprise two or more embodiments disclosed herein.

B. Branched Fatty Acid Amide

The sealant layer contains a branched fatty acid amide. A "branched fatty acid amide" is a molecule having a structure selected from Structure (I) or Structure (II):

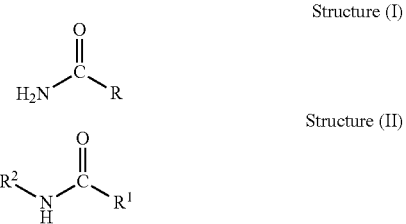

wherein R, $R^1$, and $R^2$ each is a $C_3$ to $C_{24}$ branched alkyl moiety. The R, $R^1$, and $R^2$ group alkyl moiety may be saturated, mono-unsaturated, or poly-unsaturated. A "saturated" alky moiety is an alkyl in which all carbon atoms are linked to one another via single bonds (C—C bonds). In other words, a saturated alkyl moiety excludes carbon atoms linked via double bonds (C=C bonds). A "mono-unsaturated" alky moiety is an alkyl that has one double bond (a C=C bond), with all of the remainder carbon atoms being linked via single bonds (C—C bonds). A "poly-unsaturated" alky moiety is an alkyl that has at least two double bonds (C=C bonds). A nonlimiting example of a suitable branched fatty acid amide is isooctadecanamide.

The branched fatty acid amide may be a branched primary fatty acid amide, a branched secondary fatty acid amide, or a combination thereof. A "branched primary fatty acid amide" is a molecule of the Structure (I). A "branched secondary fatty acid amide" is a molecule of the Structure (II).

In an embodiment, in the branched fatty acid amide of the Structure (I), R is a $C_{11}$ to $C_{24}$, or a $C_{13}$ to $C_{23}$, or a $C_{13}$ to $C_{17}$ branched alkyl moiety that is saturated, mono-unsaturated, or poly-unsaturated. In a further embodiment, R is selected from a $C_{13}$ branched alkyl moiety that is saturated, a $C_{15}$ branched alkyl moiety that is saturated, a $C_{17}$ branched alkyl moiety that is saturated, and combinations thereof.

In an embodiment, in the branched fatty acid amide of the Structure (II), $R^1$ is a $C_{11}$ to $C_{24}$, or a $C_{13}$ to $C_{23}$, or a $C_{13}$ to $C_{17}$ branched alkyl moiety that is saturated, mono-unsaturated, or poly-unsaturated. In a further embodiment, R is selected from a $C_{13}$ branched alkyl moiety that is saturated, a $C_{15}$ branched alkyl moiety that is saturated, a $C_{17}$ branched alkyl moiety that is saturated, and combinations thereof.

In an embodiment, the branched fatty acid amide contains a combination of molecules of the Structure (I) and the Structure (II).

In an embodiment, in the branched fatty acid amide of the Structure (I), R is a branched alkyl moiety that is saturated. In a further embodiment, the branched fatty acid amide is isooctadecanamide. One isomer of isooctadecanamide has the following Structure (III):

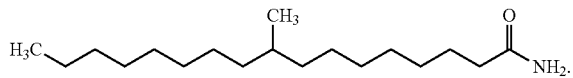

Structure (III)

In an embodiment, the branched fatty acid amide has a molecular weight from 170 g/mol, or 200 g/mol, or 250 g/mol, or 260 g/mol, or 270 g/mol, or 280 g/mol to 290 g/mol, or 300 g/mol, or 310 g/mol, or 320 g/mol, or 350 g/mol, or 370 g/mol. In an embodiment, the branched fatty acid amide is isooctadecanamide, which has a molecular weight of 283.5 g/mol.

The sealant layer may contain more than one branched fatty acid amide. In an embodiment, the sealant layer includes at least two branched fatty acid amides, wherein each branched fatty acid amide differs from one another compositionally, structurally, and/or physically.

In an embodiment, the sealant layer contains from 0.001 wt % (10 parts per million (ppm)), or 0.01 wt % (100 ppm), or 0.02 wt % (200 ppm), or 0.04 wt % (400 ppm), or 0.06 wt % (600 ppm) to 0.12 wt % (1200 ppm), or 0.15 wt % (1500 ppm), or 0.20 wt % (2000 ppm), or 0.50 wt % (5000 ppm), or 1.0 wt % (10000 ppm), or 2.0 wt % (20000 ppm), or 3.0 wt % (30000 ppm) branched fatty acid amide, based on the total weight of the sealant layer. In another embodiment, the sealant layer contains from 0.001 wt % to 3.0 wt %, or from 0.01 wt % to 2.0 wt %, or from 0.01 wt % to 1.0 wt %, or from 0.01 wt % to 0.5 wt %, or from 0.01 wt % to 0.2 wt %, or from 0.04 wt % to 0.2 wt %, or from 0.048 wt % to 0.120 wt % branched fatty acid amide, based on the total weight of the sealant layer.

The branched fatty acid amide may comprise two or more embodiments disclosed herein.

C. Linear Saturated Fatty Acid Amide

The sealant layer contains a linear saturated fatty acid amide. A "linear saturated fatty acid amide" is a molecule having a structure selected from Structure (III) or Structure (IV):

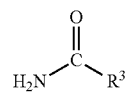

Structure (IV)

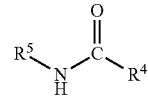

Structure (V)

wherein $R^3$, $R^4$, and $R^5$ each is a $C_3$ to $C_{27}$ linear alkyl moiety that is saturated. Nonlimiting examples of suitable linear saturated fatty acid amides include behenamide, palmitamide, stearamide, and combinations thereof.

The linear saturated fatty acid amide may be a linear saturated primary fatty acid amide, a linear saturated secondary fatty acid amide, or a combination thereof. A "linear saturated primary fatty acid amide" is a molecule of the Structure (IV). A "linear saturated secondary fatty acid amide" is a molecule of the Structure (V).

In an embodiment, in the linear saturated fatty acid amide of the Structure (IV), $R^2$ is a $C_{11}$ to $C_{25}$, or a $C_{15}$ to $C_{23}$, or a $C_{15}$ to $C_{21}$ linear alkyl moiety that is saturated. In an embodiment, $R^2$ is selected from a $C_{17}$ and a $C_{21}$ linear alkyl moiety that is saturated.

In an embodiment, in the linear saturated fatty acid amide of the Structure (V), $R^3$ is a $C_{11}$ to $C_{25}$, or a $C_{15}$ to $C_{23}$, or a $C_{15}$ to $C_{21}$ linear alkyl moiety that is saturated. In an embodiment, $R^3$ is selected from a $C_{17}$ and a $C_{21}$ linear alkyl moiety that is saturated.

In an embodiment, the linear saturated fatty acid amide contains a combination of molecules of the Structure (IV) and the Structure (V).

In an embodiment, in the linear saturated fatty acid amide of the Structure (IV), $R^2$ is a $C_{21}$ alkyl moiety that is saturated. In a further embodiment, the linear saturated fatty acid amide is behenamide. Behenamide has the following Structure (VI):

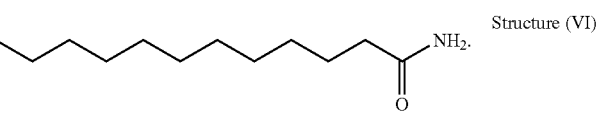

Structure (VI)

In an embodiment, the linear saturated fatty acid amide has a molecular weight from 280 g/mol, or 300 g/mol, or 310 g/mol, or 320 g/mol, or 330 g/mol to 340 g/mol, or 350 g/mol, or 700 g/mol. In an embodiment, the linear saturated fatty acid amide is behenamide, which has a molecular weight of 339.608 g/mol.

The sealant layer may contain more than one linear saturated fatty acid amide. In an embodiment, the sealant layer includes at least two linear saturated fatty acid amides, wherein each linear saturated fatty acid amide differs from one another compositionally, structurally, and/or physically.

In an embodiment, the sealant layer contains from 0.0025 wt % (25 ppm), or 0.0075 wt % (75 ppm), or 0.01 wt % (100 ppm), or 0.05 wt % (500 ppm), or 0.10 wt % (1000 ppm) to 0.12 wt % (1200 ppm), or 0.15 wt % (1500 ppm), or 0.20 wt % (2000 ppm), or 0.50 wt % (5000 ppm), or 1.0 wt % (10000 ppm), or 1.5 wt % (15000 ppm) linear saturated fatty acid amide, based on the total weight of the sealant layer. In another embodiment, the sealant layer contains from 0.0025 wt % to 1.5 wt %, or from 0.01 wt % to 1.0 wt %, or from 0.05 wt % to 0.50 wt %, or from 0.10 wt % to 0.15 wt % linear saturated fatty acid amide, based on the total weight of the sealant layer.

The linear saturated fatty acid amide may comprise two or more embodiments disclosed herein.

D. Optional Additive(s)

In an embodiment, the sealant layer includes one or more optional additives. Nonlimiting examples of suitable additives include antiblock agents, antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, crosslinking agents (e.g., peroxides), and combinations thereof.

In an embodiment, the sealant layer includes an antiblock agent. An "antiblock agent" is a compound that minimizes, or prevents, blocking (i.e., adhesion) between two adjacent layers of film by creating a microscopic roughening of the film layer surface, which reduces the available contact area between adjacent layers. The antiblock agent may be organic or inorganic. Nonlimiting examples of suitable antiblock agents include silica, talc, calcium carbonate, and combinations thereof.

In an embodiment, the antiblock agent is talc. In an embodiment, the sealant layer contains from 0 wt %, or 0.10 wt % (1000 ppm), or 0.15 wt % (1500 ppm), or 0.20 wt % (2000 ppm), or 0.25 wt % (2500 ppm) to 0.3 wt % (3000 ppm), or 0.4 wt % (4000 ppm), or 0.5 wt % (5000 ppm), or 1.0 wt % (10000 ppm), or 1.5 wt % (15000 ppm), or 2.0 wt % (20000 ppm) talc, based on the total weight of the sealant layer. In another embodiment, the sealant layer contains from 0.10 wt % to 2.0 wt %, or from 0.10 wt % to 1.0 wt %, or from 0.10 wt % to 0.5 wt %, or from 0.10 wt % to 0.20 wt % talc, based on the total weight of the sealant layer.

In an embodiment, the antiblock agent is silica ($SiO_2$). The silica may be organic silica or synthetic silica. In an embodiment, the antiblock agent is synthetic silica. In an embodiment, the sealant layer contains from 0 wt %, or 0.10 wt % (1000 ppm), or 0.20 wt % (2000 ppm), or 0.25 wt % (2500 ppm) to 0.3 wt % (3000 ppm), or 0.4 wt % (4000 ppm), or 0.5 wt % (5000 ppm), or 1.0 wt % (10000 ppm), or 1.5 wt % (15000 ppm), or 2.0 wt % (20000 ppm) silica, based on the total weight of the sealant layer.

In an embodiment, the sealant layer contains from 0 wt %, or 0.01 wt %, or 0.05 wt %, or 0.1 wt % to 0.2 wt %, or 0.3 wt %, or 0.4 wt %, or 0.5 wt %, or 1.0 wt %, or 2.0 wt %, or 3.0 wt %, or 4.0 wt %, or 5.0 wt % additive, based on the total weight of the sealant layer.

The additive may comprise two or more embodiments disclosed herein.

In an embodiment, the sealant layer is void of, or substantially void of, linear unsaturated fatty acid amide. In other words, the linear saturated fatty acid amide is present in the sealant layer to the exclusion of linear unsaturated fatty acid amide. A "linear unsaturated fatty acid amide" is a molecule having a structure selected from Structure (VII) or Structure (VIII):

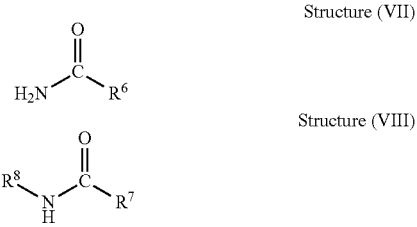

Structure (VII)

Structure (VIII)

wherein $R^6$, $R^7$, and $R^8$ each is a $C_3$ to $C_{27}$ linear alkyl moiety that is mono-unsaturated or poly-unsaturated. The linear unsaturated fatty acid amide may be a linear unsaturated primary fatty acid amide, a linear unsaturated secondary fatty acid amide, or a combination thereof. A "linear unsaturated primary fatty acid amide" is a molecule of the Structure (VII). A "linear unsaturated secondary fatty acid amide" is a molecule of the Structure (VIII). Nonlimiting examples of linear unsaturated fatty acid amides include erucamide and oleamide.

In an embodiment, the sealant layer is void of, or substantially void of, one or both of erucamide and oleamide.

In an embodiment, the sealant layer contains less than 5 ppm, or from 0 ppm to less than 5 ppm linear unsaturated fatty acid amide, based on the total weight of the sealant layer. In another embodiment, the sealant layer contains less than 5 ppm, or from 0 ppm to less than 5 ppm erucamide, based on the total weight of the sealant layer. In a further embodiment, the sealant layer contains from 0 ppm to 3 ppm, or from 0 ppm to 2 ppm, or from 0 ppm to 1 ppm linear unsaturated fatty acid amide, based on the total weight of the sealant layer.

In an embodiment, the sealant layer contains from 0.01 wt %, or 0.10 wt %, or 0.20 wt % to 0.24 wt %, or 0.25 wt %, or 0.30 wt %, or 0.35 wt %, or 0.40 wt %, or 0.45 wt %, or 0.50 wt %, or 0.80 wt %, or 1.0 wt % of a combined amount of the branched fatty acid amide and the linear saturated fatty acid amide, based on the total weight of the sealant layer. In another embodiment, the sealant layer contains from 0.01 wt % to 1.0 wt %, or from 0.01 wt % to 0.50 wt %, or from 0.10 wt % to 0.50 wt % of a combined amount of the branched fatty acid amide and the linear saturated fatty acid amide, based on the total weight of the sealant layer.

In an embodiment, the sealant layer contains from 0.01 wt %, or 0.10 wt %, or 0.20 wt % to 0.24 wt %, or 0.25 wt %, or 0.30 wt %, or 0.35 wt %, or 0.40 wt %, or 0.45 wt %, or 0.50 wt %, or 0.80 wt %, or 1.0 wt % of a combined amount of the branched fatty acid amide and the linear saturated fatty acid amide, based on the total weight of the sealant layer. In another embodiment, the sealant layer contains from 0.01 wt % to 1.0 wt %, or from 0.01 wt % to 0.50 wt %, or from 0.10 wt % to 0.50 wt % of a combined amount of the branched fatty acid amide and the linear saturated fatty acid amide, based on the total weight of the sealant layer.

The branched fatty acid amide and the linear saturated fatty acid amide have a weight ratio of from 1:5 to 3:1, or from 1:4 to 2:1, or from 1:5 to 2:1, or from 1:4 to 1:1.

In an embodiment, the multilayer film includes a sealant layer with a surface having a pre-lamination COF from 0.01, or 0.05, or 0.08 to 0.10, or 0.12, or 0.15, or 0.20, or 0.25. In another embodiment, the multilayer film includes a sealant layer with a surface having a pre-lamination COF from 0.01 to 0.25, or from 0.01 to 0.20, or from 0.01 to less than 0.20, or from 0.01 to 0.15, or from 0.01 to 0.12, or from 0.01 to 0.10.

In an embodiment, the sealant layer has a thickness from 5 μm, or 8 μm, or 10 μm, or 15 μm to 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 90 μm, or 100 μm, or 120 μm, or 150 μm.

The sealant layer may comprise two or more embodiments disclosed herein.

2. Second Layer

The multilayer film includes a second layer. The second layer contains a second ethylene-based polymer.

The second layer has two opposing surfaces. In an embodiment, the second layer is a continuous layer with two opposing surfaces.

The second layer is in contact with the sealant layer. The second layer may be in direct contact or in indirect contact with the sealant layer. In an embodiment, the second layer directly contacts the sealant layer. The term "directly contacts," as used herein, is a layer configuration whereby the second layer is located immediately adjacent to the sealant layer and no intervening layers, or no intervening structures, are present between the sealant layer and the second layer.

In another embodiment, the second layer indirectly contacts the sealant layer. The term "indirectly contacts," as used herein, is a layer configuration whereby an intervening layer, or an intervening structure, is present between the sealant layer and the second layer.

The second ethylene-based polymer may be any ethylene-based polymer disclosed herein. The second ethylene-based polymer may be the same or different than the ethylene-based polymer of the sealant layer. In an embodiment, the second ethylene-based polymer is the same as the ethylene-based polymer of the sealant layer. In another embodiment, the second ethylene-based polymer is different than the ethylene-based polymer of the sealant layer.

In an embodiment, the second ethylene-based polymer is a LLDPE, a LDPE, or a combination thereof. In a further embodiment, the LLDPE is an ethylene/1-octene copolymer. In an embodiment, the second layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the second layer. In another embodiment, the second layer contains from 60 wt % to 90 wt %, or from 70 wt % to 80 wt % LLDPE, and from 10 wt % to 40 wt %, or from 20 wt % to 30 wt % LDPE, based on the total weight of the second layer.

In an embodiment, the second layer contains one or more optional additives. The additive may be any additive disclosed herein. In an embodiment, the second layer contains from 0 wt %, or 0.01 wt % to 0.5 wt %, or 1.0 wt %, or 3.0 wt %, or 5.0 wt % additive, based on the total weight of the second layer.

In an embodiment, the second layer has a thickness from 5 µm, or 8 µm, or 10 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

The second layer may be a substrate layer or a core layer. In an embodiment, the second layer is a core layer. A "core layer" is a layer of a film structure that is an inner layer. In other words, neither surface of a core layer is an outermost surface of the film. In another embodiment, the second layer is a substrate layer. A "substrate layer" is a layer of a film structure that may be an inner layer or a skin layer. A "skin layer" is an outermost layer of a film structure. In other words, at least one surface of a skin layer is an outermost surface of the film.

The second layer may comprise two or more embodiments disclosed herein.

3. Optional Third Layer

In an embodiment, the multilayer film includes an optional third layer. The third layer contains a third ethylene-based polymer.

The third layer has two opposing surfaces. In an embodiment, the third layer is a continuous layer with two opposing surfaces. The third layer is in contact with the second layer. The third layer may be in direct contact or in indirect contact with the second layer. In an embodiment, the third layer directly contacts the second layer. In another embodiment, the third layer indirectly contacts the second layer.

The third ethylene-based polymer may be any ethylene-based polymer disclosed herein. The third ethylene-based polymer may be the same or different than the first ethylene-based polymer of the sealant layer, and the third ethylene-based polymer may be the same or different than the second ethylene-based polymer of the second layer. In an embodiment, the third ethylene-based polymer is the same as the second ethylene-based polymer of the second layer. In another embodiment, the third ethylene-based polymer is different than the second ethylene-based polymer of the second layer.

In an embodiment, the third ethylene-based polymer is a LLDPE, a LDPE, or a combination thereof. In an embodiment, the third layer contains from 5 wt %, or 10 wt %, or 20 wt %, or 30 wt %, or 40 wt %, or 50 wt %, or 60 wt %, or 70 wt %, or 80 wt % to 90 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the third layer. In another embodiment, the third layer contains from 60 wt % to 90 wt %, or from 70 wt % to 80 wt % LLDPE, and from 10 wt % to 40 wt %, or from 20 wt % to 30 wt % LDPE, based on the total weight of the third layer.

In an embodiment, the third layer contains one or more optional additives. The additive may be any additive disclosed herein. In an embodiment, the third layer contains from 0 wt %, or 0.01 wt % to 0.5 wt %, or 1.0 wt %, or 3.0 wt %, or 5.0 wt % additive, based on the total weight of the third layer.

In an embodiment, the third layer has a thickness from 5 µm, or 8 µm, or 10 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

The third layer may be a substrate layer or a core layer. In another embodiment, the third layer is a substrate layer.

The third layer may comprise two or more embodiments disclosed herein.

In an embodiment, the multilayer film has the following Structure (IX):

sealant layer/second layer                                        Structure (IX).

In an embodiment, the sealant layer and the third layer are skin layers on opposing sides of the second layer, which is a core layer. In a further embodiment, the sealant layer is in direct contact with the second layer, and the second layer is in direct contact with the third layer. In an embodiment, the multilayer film has the following Structure (X):

sealant layer/second layer/third layer                       Structure (X).

In an embodiment, the multilayer film consists essentially of, or consists of, the sealant layer and the second layer. In another embodiment, the multilayer film consists essentially of, or consists of, the sealant layer, the second layer, and the third layer.

In an embodiment, the multilayer film has a thickness from 15 μm, or 20 μm, or 25 μm, or 30 μm, or 35 μm, or 40 μm, or 45 μm, or 50 μm to 55 μm, or 60 μm, or 65 μm, or 70 μm, or 75 μm, or 80 μm, or 85 μm, or 90 μm, or 95 μm, or 100 μm, or 150 μm, or 200 μm, or 250 μm, or 300 μm.

In an embodiment, the multilayer film contains, consists essentially of, or consists of:
(1) a sealant layer containing, consisting essentially of, or consisting of:
 (A) from 75 wt %, or 80 wt %, or 85 wt %, or 90 wt % to 93 wt %, or 94 wt %, or 95 wt %, or 98 wt %, or 99 wt %, or 99.5 wt %, or 99.99 wt % of the first ethylene-based polymer (such as LLDPE and/or LDPE), based on the total weight of the sealant layer, the first ethylene-based polymer having (i) a density from 0.895 g/cc, or 0.900 g/cc, or 0.905 g/cc, or 0.910 g/cc, or 0.915 g/cc, or 0.920 g/cc to 0.925 g/cc; and (ii) a melt index from 0.5 g/10 min to 1.0 g/10 min, or 1.5 g/10 min, or 2.0 g/10 min, or 3.0 g/10 min, or 5.0 g/10 min, or 8.0 g/10 min, or 10.0 g/10 min, or 15 g/10 min, or 25 g/10 min, or 30 g/10 min;
 (B) from 0.001 wt %, or 0.01 wt %, or 0.02 wt %, or 0.04 wt %, or 0.06 wt % to 0.12 wt %, or 0.15 wt %, or 0.20 wt %, or 0.50 wt %, or 1.0 wt %, or 2.0 wt %, or 3.0 wt % branched fatty acid amide (such as isooctadecanamide), based on the total weight of the sealant layer;
 (C) from 0.0025 wt %, or 0.0075 wt %, or 0.01 wt %, or 0.05 wt %, or 0.10 wt % to 0.12 wt %, or 0.15 wt %, or 0.20 wt %, or 0.50 wt %, or 1.0 wt %, or 1.5 wt % linear saturated fatty acid amide (such as behenamide), based on the total weight of the sealant layer;
 (D) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive (such as an antiblock agent), based on the total weight of the sealant layer; and
the branched fatty acid amide and the linear saturated fatty acid amide have a weight ratio of from 1:5 to 3:1, or from 1:4 to 1:1; and
(2) a second layer in contact with the sealant layer, the second layer containing a second ethylene-based polymer (such as LLDPE, LDPE, or a combination thereof);
(3) optionally, a third layer in contact with the second layer, the third layer containing a third ethylene-based polymer (such as LLDPE, LDPE, or a combination thereof); and
the multilayer film has one, some, or all of the following properties: (i) the sealant layer has a thickness from 5 μm, or 8 μm, or 10 μm, or 15 μm to 20 μm, or 25 μm, or 30 μm, or 35 μm, or 40 μm, or 50 μm, or 60 μm, or 70 μm, or 80 μm, or 90 μm; and/or (ii) the sealant layer contains from 0.01 wt %, or 0.10 wt %, or 0.20 wt % to 0.24 wt %, or 0.25 wt %, or 0.30 wt %, or 0.35 wt %, or 0.40 wt %, or 0.45 wt %, or 0.50 wt %, or 0.80 wt %, or 1.0 wt % of a combined amount of the branched fatty acid amide and the linear saturated fatty acid amide, based on the total weight of the sealant layer; and/or (iii) the sealant layer contains from 0.01 wt %, or 0.10 wt %, or 0.20 wt % to 0.24 wt %, or 0.25 wt %, or 0.30 wt %, or 0.35 wt %, or 0.40 wt %, or 0.45 wt %, or 0.50 wt %, or 0.80 wt %, or 1.0 wt % of a combined amount of the branched fatty acid amide, the linear saturated fatty acid amide, and the linear unsaturated fatty acid amide, based on the total weight of the sealant layer; and/or (iv) the sealant layer has a surface having a pre-lamination COF from 0.01 to 0.25, or from 0.01 to 0.20, or from 0.01 to less than 0.20, or from 0.01 to 0.15, or from 0.01 to 0.12, or from 0.01 to 0.10; and/or (v) the second layer has a thickness from 5 μm, or 8 μm, or 10 μm, or 15 μm to 20 μm, or 25 μm, or 30 μm, or 35 μm, or 40 μm, or 50 μm, or 60 μm, or 70 μm, or 80 μm, or 90 μm; and/or (vi) the third layer has a thickness from 5 μm, or 8 μm, or 10 μm, or 15 μm to 20 μm, or 25 μm, or 30 μm, or 35 μm, or 40 μm, or 50 μm, or 60 μm, or 70 μm, or 80 μm, or 90 μm; and/or (vii) the multilayer film has a thickness of from 20 μm, or 30 μm, or 40 μm, or 50 μm to 55 μm, or 60 μm, or 70 μm, or 80 μm, or 90 μm, or 100 μm, or 150 μm, or 200 μm, or 250 μm; and/or (viii) the sealant layer is void of, or substantially void of, linear unsaturated fatty acid amide.

It is understood that the sum of the components in each of the layers disclosed herein, including the foregoing layers, yields 100 weight percent (wt %), based on the total weight of each respective layer.

In an embodiment, the multilayer film excludes non-migratory slip agents, such as silicone.

Some methods, for example, used to construct films are by cast extrusion or blown extrusion methods. Combinations of these methods are also possible. In an embodiment, the multilayer film is a coextruded blown film.

The multilayer film may or may not be oriented. In an embodiment, the multilayer film is not an oriented film. In a further embodiment, the multilayer film is not biaxially oriented. In other words, the multilayer film is not stretched after extrusion. In another embodiment, the multilayer film is oriented (e.g., biaxially oriented).

In an embodiment, the multilayer film is included in a laminate. In such embodiments, an outermost surface of the sealant layer is an outermost surface of the laminate.

The multilayer film may comprise two or more embodiments disclosed herein.

Laminate

The present disclosure provides a laminate. The laminate includes a first film containing a sealant layer and a second film, wherein the first film is laminated to the second film. The sealant layer contains (A) a first ethylene-based polymer having a density from 0.895 g/cc to 0.925 g/cc and a melt index from 0.5 g/10 min to 30 g/10 min; (B) branched fatty acid amide; and (C) a linear saturated fatty acid amide. The branched fatty acid amide and the linear saturated primary fatty acid amide have a weight ratio of from 1:5 to 3:1.

The laminate contains at least two films, or more than two films. For example, the laminate can have two, three, four, five, six, seven, eight, nine, ten, eleven, or more films. In an embodiment, the laminate contains only two films, or only three films.

In an embodiment, the laminate has the following Structure (XI):

first film/second film          Structure (XI).

In an embodiment, the laminate includes a first film, an adhesive layer in contact with the first film, and a second film in contact with the adhesive layer. In an embodiment, the laminate has the following Structure (XII):

first film/adhesive layer/second film          Structure (XII)

In an embodiment, the first film is a monolayer film containing a sealant layer and the second film is a monolayer film containing a substrate layer, and the laminate has the following Structure (XIII):

sealant layer/adhesive layer/substrate layer    Structure (XIII).

In an embodiment, the laminate includes an optional third film laminated to the second film. In a further embodiment, the laminate includes an optional second adhesive layer in contact with the second film, and an optional third film in contact with the second adhesive layer. In an embodiment, the laminate has the following Structure (XIV):

first film/adhesive layer/second film/second adhesive layer/third film    Structure (XIV).

1. First Film

The laminate includes a first film. The first film includes a sealant layer.

The first film has two opposing surfaces. The first film may be a monolayer film or a multilayer film. In an embodiment, the first film is a multilayer film containing at least two layers, or more than two layers. For example, the first film can have two, three, four, five, six, seven, eight, nine, ten, or more layers. In an embodiment, the first film contains only one layer, or only three layers.

In an embodiment, the first film is a multilayer film including an optional core layer in contact with the sealant layer and an optional third substrate layer in contact with the core layer. In an embodiment, the outermost surface of the third substrate is laminated to an outermost surface of the second film.

A. Sealant Layer

The first film contains a sealant layer. The sealant layer may be any sealant layer disclosed herein. In an embodiment, the sealant layer is a skin layer. In other words, an outermost surface of the sealant layer is an outermost surface of the first film, and further an outermost surface of the laminate.

B. Optional Core Layer and Optional Third Substrate Layer

In an embodiment, the first film is a multilayer film that includes a core layer and a third substrate layer.

The core layer has two opposing surfaces. In an embodiment, the core layer is a continuous layer with two opposing surfaces. The core layer is in contact with the sealant layer. The core layer may be in direct contact or in indirect contact with the sealant layer. In an embodiment, the core layer directly contacts the sealant layer. In another embodiment, the core layer indirectly contacts the sealant layer.

In an embodiment, the core layer contains a third ethylene-based polymer. The third ethylene-based polymer may be any ethylene-based polymer disclosed herein. The third ethylene-based polymer may be the same or different than the ethylene-based polymer of the sealant layer. In an embodiment, the third ethylene-based polymer is a LLDPE, a LDPE, or a combination thereof. In an embodiment, the core layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the core layer. In another embodiment, the core layer contains from 60 wt % to 90 wt %, or from 70 wt % to 80 wt % LLDPE, and from 10 wt % to 40 wt %, or from 20 wt % to 30 wt % LDPE, based on the total weight of the core layer.

In an embodiment, the core layer contains one or more optional additives. The additive may be any additive disclosed herein. In an embodiment, the core layer contains from 0 wt %, or 0.01 wt % to 0.5 wt %, or 1.0 wt %, or 3.0 wt %, or 5.0 wt % additive, based on the total weight of the core layer. In an embodiment, the core layer contains an additive that is a slip agent selected from a branched fatty acid amide, a linear saturated fatty acid amide, and combinations thereof.

In an embodiment, the core layer has a thickness from 5 µm, or 8 µm, or 10 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

The third substrate layer has two opposing surfaces. In an embodiment, the third substrate layer is a continuous layer with two opposing surfaces. The third substrate layer is in contact with the core layer and the second film. The third substrate layer may be in direct contact or in indirect contact with the core layer. In an embodiment, the third substrate layer directly contacts the core layer. In another embodiment, the third substrate layer indirectly contacts the core layer. The third substrate layer may be in direct contact or in indirect contact with the second film. In an embodiment, the third substrate layer directly contacts the second film. In another embodiment, the third substrate layer indirectly contacts the second film.

In an embodiment, the third substrate layer contains a fourth ethylene-based polymer. The fourth ethylene-based polymer may be any ethylene-based polymer disclosed herein. The fourth ethylene-based polymer may be the same or different than the ethylene-based polymer of the sealant layer, and the fourth ethylene-based polymer may be the same or different than the third ethylene-based polymer of the core layer. In an embodiment, the fourth ethylene-based polymer is a LLDPE, a LDPE, or a combination thereof. In an embodiment, the third substrate layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the third substrate layer. In another embodiment, the third substrate layer contains from 60 wt % to 90 wt %, or from 70 wt % to 80 wt % LLDPE, and from 10 wt % to 40 wt %, or from 20 wt % to 30 wt % LDPE, based on the total weight of the third substrate layer.

In an embodiment, the third substrate layer contains one or more optional additives. The additive may be any additive disclosed herein. In an embodiment, the core layer contains from 0 wt %, or 0.01 wt % to 0.5 wt %, or 1.0 wt %, or 3.0 wt %, or 5.0 wt % additive, based on the total weight of the third substrate layer.

In an embodiment, the third substrate layer has a thickness from 5 µm, or 8 µm, or 10 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

In an embodiment, the third substrate layer is corona treated.

The core layer and the third substrate layer may comprise two or more embodiments disclosed herein.

The first film may comprise two or more embodiments disclosed herein.

2. Second Film

The laminate includes a second film. The first film is laminated to the second film.

The second film has two opposing surfaces. The second film may be a monolayer film or a multilayer film. In an embodiment, the second film is a monolayer film. In another embodiment, the second film is a multilayer film containing at least two layers, or more than two layers. In an embodiment, the second film contains only one layer, or only two layers, or only three layers.

In an embodiment, the second film includes a substrate layer. The substrate layer has two opposing surfaces. In an embodiment, the substrate layer is a continuous layer with two opposing surfaces.

The substrate layer is in contact with the first film. The substrate layer may be in direct contact or in indirect contact with the first film. In an embodiment, the substrate layer directly contacts the first film. In another embodiment, the substrate layer indirectly contacts the first film.

In an embodiment, the substrate layer is in contact with an optional adhesive layer. The substrate layer may be in direct contact or in indirect contact with the adhesive layer. In an embodiment, the substrate layer directly contacts the adhesive layer. In another embodiment, the substrate layer indirectly contacts the adhesive layer.

In an embodiment, the substrate layer contains a component selected from a second ethylene-based polymer, propylene-based polymer, polyamide (such as nylon), polyester, ethylene vinyl alcohol copolymer, polyethylene terephthalate (PET), ethylene vinyl acrylate copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacrylic acid, maleic anhydride grafted ethylene-based polymer, a polystyrene, a metal foil, and combinations thereof. In an embodiment, the substrate layer contains PET. In a further embodiment, the substrate layer contains biaxially oriented PET. In another embodiment, the substrate layer contains a second ethylene-based polymer. The second ethylene-based polymer may be any ethylene-based polymer disclosed herein. The second ethylene-based polymer may be the same or different than the ethylene-based polymer of the sealant layer.

In an embodiment, the second film, or further the substrate layer, has a thickness from 5 µm, or 8 µm, or 10 µm, or 12 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 150 µm.

The substrate layer may comprise two or more embodiments disclosed herein.

The second film may comprise two or more embodiments disclosed herein.

3. Optional Adhesive Layer

In an embodiment, the laminate includes an adhesive layer. The adhesive layer is in contact with the first film and the second film.

The adhesive layer has two opposing surfaces. In an embodiment, the adhesive layer is a continuous layer with two opposing surfaces. The adhesive layer is in contact with the first film. The adhesive layer may be in direct contact or in indirect contact with the first film. In an embodiment, the adhesive layer directly contacts the first film. In another embodiment, the adhesive layer indirectly contacts the first film.

The adhesive layer contains an adhesive. Nonlimiting examples of suitable adhesives include polyurethane adhesives (e.g., MOR-FREE™ 705/C-79 and MOR-FREE™ 706A/C-79, each available from Rohm and Haas), polyacrylate adhesives (e.g., ROBOND™ L-168/CR3A, available from The Dow Chemical Company), and combinations thereof.

In an embodiment, the adhesive layer has a dry coating weight of from 0.5 grams per square meter ($g/m^2$), or 1.0 $g/m^2$, or 1.5 $g/m^2$, or 1.8 $g/m^2$ to 1.9 $g/m^2$, or 2.0 $g/m^2$, or 2.5 $g/m^2$, or 3.0 $g/m^2$.

The adhesive layer may comprise two or more embodiments disclosed herein.

4. Optional Third Film

In an embodiment, the laminate includes a third film. The third film is laminated to the second film.

The third film has two opposing surfaces. The third film may be a monolayer film or a multilayer film. In an embodiment, the third film is a monolayer film. In another embodiment, the third film is a multilayer film containing at least two layers, or more than two layers. In an embodiment, the third film contains only one layer, or only two layers, or only three layers.

In an embodiment, the third film includes a second substrate layer. The second substrate layer may be any substrate layer disclosed herein.

The second substrate layer is in contact with the second film. The second substrate layer may be in direct contact or in indirect contact with the second film. In an embodiment, the second substrate layer directly contacts the second film. In another embodiment, the second substrate layer indirectly contacts the second film.

The second substrate layer may comprise two or more embodiments disclosed herein.

The third film may comprise two or more embodiments disclosed herein

5. Optional Second Adhesive Layer

In an embodiment, the laminate includes a second adhesive layer. The second adhesive layer is in contact with the second film. The second adhesive layer may be any adhesive layer disclosed herein.

The second adhesive layer is in contact with the second film. The second adhesive layer may be in direct contact or in indirect contact with the second film. In an embodiment, the second adhesive layer directly contacts the second film. In another embodiment, the second adhesive layer indirectly contacts the second film. In an embodiment, the second adhesive layer is in contact with the optional third film. The second adhesive layer may be in direct contact or in indirect contact with the third film. In an embodiment, the second adhesive layer directly contacts the third film. In another embodiment, the second adhesive layer indirectly contacts the third film.

The second adhesive layer may comprise two or more embodiments disclosed herein

In an embodiment, the first film is a multilayer film with a sealant layer, a core layer, and a third substrate layer; and the second film is a monolayer film containing a substrate layer; and the laminate has the following Structure (XV):

sealant layer/core layer/third substrate layer/
adhesive layer/substrate layer     Structure (XV).

In an embodiment, the first film is a multilayer film with a sealant layer, a core layer, and a third substrate layer; and the second film is a monolayer film containing a substrate layer; the third film is a monolayer film containing a second substrate layer; and the laminate has the following Structure (XVI): sealant layer/core layer/third substrate layer/adhesive layer/substrate layer/second adhesive layer/second substrate layer     Structure (XVI).

In an embodiment, the sealant layer of the laminate has a pre-lamination COF from 0.01, or 0.05, or 0.08 to 0.10, or 0.12, or 0.15, or 0.20, or 0.25. In another embodiment, the sealant layer of the laminate has a pre-lamination COF from 0.01 to 0.25, or from 0.01 to 0.20, or from 0.01 to less than 0.20, or from 0.01 to 0.15, or from 0.01 to 0.12, or from 0.01 to 0.10.

In an embodiment, the sealant layer of the laminate has a laminate COF after curing at 60° C. for 3 days (the "Laminate 60° C. Aged COF") from 0.01, or 0.05, or 0.10, or 0.15, or 0.20 to 0.23, or 0.25, or 0.28, or 0.29, or 0.30. In another embodiment, the sealant layer of the laminate has a Laminate 60° C. Aged COF from 0.01 to 0.30, or from 0.01 to less than 0.30, or from 0.10 to 0.29, or from 0.10 to 0.25.

In an embodiment, the laminate contains, consists essentially of, or consists of:
(1) a first film containing
  (A) a sealant layer containing, consisting essentially of, or consisting of: (i) from 70 wt %, or 75 wt %, or 80 wt %, or 85 wt %, or 90 wt % to 93 wt %, or 94 wt %, or 95 wt %, or 98 wt %, or 99 wt %, or 99.5 wt %, or 99.99 wt % ethylene-based polymer (such as LLDPE and/or LDPE), based on the total weight of the sealant layer, the ethylene-based polymer having (a) a density from 0.895 g/cc, or 0.905 g/cc, or 0.910 g/cc, or 0.915 g/cc, or 0.920 g/cc to 0.925 g/cc; and (b) a melt index from 0.5 g/10 min to 1.0 g/10 min, or 1.5 g/10 min, or 2.0 g/10 min, or 3.0 g/10 min, or 5.0 g/10 min, or 8.0 g/10 min, or 10.0 g/10 min, or 15 g/10 min, or 25 g/10 min, or 30 g/10 min; (ii) from 0.001 wt %, or 0.01 wt %, or 0.02 wt %, or 0.04 wt %, or 0.06 wt % to 0.12 wt %, or 0.15 wt %, or 0.20 wt %, or 0.50 wt %, or 1.0 wt %, or 2.0 wt %, or 3.0 wt % branched fatty acid amide (such as isooctadecanamide), based on the total weight of the sealant layer; (iii) from 0.0025 wt %, or 0.0075 wt %, or 0.01 wt %, or 0.05 wt %, or 0.10 wt % to 0.12 wt %, or 0.15 wt %, or 0.20 wt %, or 0.50 wt %, or 1.0 wt %, or 1.5 wt % linear saturated fatty acid amide (such as behenamide), based on the total weight of the sealant layer; (iv) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive (such as an antiblock agent), based on the total weight of the sealant layer; and the branched fatty acid amide and the linear saturated fatty acid amide have a weight ratio of from 1:5 to 3:1, or from 1:4 to 1:1; and
  (B) optionally, a core layer in contact with the sealant layer, the core layer containing a third ethylene-based polymer (such as LLDPE and/or LDPE);
  (C) optionally, a third substrate layer in contact with the core layer, the third substrate layer containing a fourth ethylene-based polymer (such as LLDPE and/or LDPE);
(2) optionally, an adhesive layer in contact with the first film;
(3) a second film containing a substrate layer in contact with the adhesive layer, the substrate layer containing a component selected from a second ethylene-based polymer, a propylene-based polymer, a polyamide (such as nylon), a polyester, PET (such as biaxially oriented PET), a metal foil, and combinations thereof;
wherein the first film is laminated to the second film; and the laminate has one, some, or all of the following properties; and the laminate has one, some, or all of the following properties: (i) the sealant layer contains from 0.01 wt %, or 0.10 wt %, or 0.20 wt % to 0.24 wt %, or 0.25 wt %, or 0.30 wt %, or 0.35 wt %, or 0.40 wt %, or 0.45 wt %, or 0.50 wt %, or 0.80 wt %, or 1.0 wt % of a combined amount of the branched fatty acid amide and the linear saturated fatty acid amide, based on the total weight of the sealant layer; and/or (ii) the sealant layer contains from 0.01 wt %, or 0.10 wt %, or 0.20 wt % to 0.24 wt %, or 0.25 wt %, or 0.30 wt %, or 0.35 wt %, or 0.40 wt %, or 0.45 wt %, or 0.50 wt %, or 0.80 wt %, or 1.0 wt % of a combined amount of the branched fatty acid amide and the linear saturated fatty acid amide, based on the total weight of the sealant layer; and/or (iii) the sealant layer has a Pre-Lamination COF from 0.01 to 0.25, or from 0.01 to 0.20, or from 0.01 to less than 0.20, or from 0.01 to 0.15, or from 0.01 to 0.12, or from 0.01 to 0.10; and/or (iv) the sealant layer has a Laminate 60° C. Aged COF from 0.01 to 0.30, or from 0.01 to less than 0.30, or from 0.10 to 0.29, or from 0.10 to 0.25; and/or (vii) the laminate has a thickness of from 15 μm, or 20 μm, or 30 μm, or 40 μm, or 45 μm, or 50 μm to 55 μm, or 60 μm, or 65 μm, or 70 μm, or 75 μm, or 80 μm, or 85 μm, or 90 μm, or 95 μm, or 100 μm, or 150 μm, or 200 μm, or 250 μm, or 300 μm; and/or (viii) the sealant layer is void of, or substantially void of, linear unsaturated fatty acid amide.

In an embodiment, the branched fatty acid amide and the linear saturated fatty acid amide have a weight ratio of from 1:5 to 3:1, or from 1:4 to 1:1, and the sealant layer of the laminate has one, some, or all of the following properties: (i) a pre-lamination COF from 0.01, or 0.05, or 0.08 to 0.10, or 0.12, or 0.15, or 0.20, or 0.25; and/or (ii) a Laminate 60° C. Aged COF from 0.01, or 0.05, or 0.10, or 0.15, or 0.20 to 0.23, or 0.25, or 0.28, or 0.29, or 0.30. In a further embodiment, the sealant layer is void of, or substantially void of, linear unsaturated fatty acid amide.

In an embodiment, the laminate excludes non-migratory slip agents, such as silicone.

In an embodiment, the laminate is void of, or substantially void of, linear unsaturated fatty acid amide.

The first film, the second film, and the optional third film of the laminate may be a coextruded multilayer structure.

Some methods, for example, used to construct laminates are by adhesive lamination, extrusion lamination, thermal lamination, dry lamination, and solvent-less lamination. Combinations of these methods are also possible.

The first film, the second film, and the optional third film of the laminate may or may not be oriented. In an embodiment, one or more, or each of the first film, the second film, and the optional third film is not an oriented film. In another embodiment, one or more, or each of first film, the second film, and the optional third film is oriented (e.g., biaxially oriented).

The laminate may comprise two or more embodiments disclosed herein.

The present disclosure also provides an article containing the multilayer film and/or the laminate, such as a package. Nonlimiting examples of suitable packages include food packages, specialty packages, and detergent packages (liquid and powder). In an embodiment, a package is provided, the package formed from two opposing laminates. In an embodiment, the sealant layer of the first laminate is in contact with the sealant layer of the second laminate. In a further embodiment, a heat seal is formed from the opposing sealant layers to produce a package.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
|---|---|---|
| DOWLEX ™ 2045G (ethylene/1-octene copolymer) (LLDPE) | MI (I2)(190° C./2.16 kg) = 1.0 g/10 min; Density = 0.920 g/cc | The Dow Chemical Company |
| DOWLEX ™ 2045.11G (ethylene/1-octene copolymer) (LLDPE) | MI (I2)(190° C./2.16 kg) = 1.0 g/10 min; Density = 0.922 g/cc Contains 1200 ppm linear unsaturated fatty acid amide and 3000 ppm inorganic antiblock | The Dow Chemical Company |
| DOW ™ LDPE 722 (LDPE) | MI (I2)(190° C./2.16 kg) = 8.0 g/10 min; Density = 0.918 g/cc | The Dow Chemical Company |
| AGILITY ™ 1001 Performance LDPE (LDPE) | MI (I2)(190° C./2.16 kg) = 0.65 g/10 min; Density = 0.920 g/cc | The Dow Chemical Company |
| Talc Concentrate | 50 wt % talc dispersed in DOWLEX ™ carrier resin | The Dow Chemical Company |
| INCROSLIP ™ SL | Mixture of branched saturated fatty acid amides and linear saturated fatty acid amides, each having chain lengths of $C_{14}$-$C_{18}$, wherein the branched saturated fatty acid amide weight fraction is greater than, or equal to, 40 wt % $C_{18}$ fraction has a branched saturated fatty acid amide:linear saturated fatty acid amide molar ratio of 50:50. The majority branched saturated fatty acid is isooctadecanamide, which has a molecular weight of 283.5 g/mol, and one of its isomers has the following structure:<br>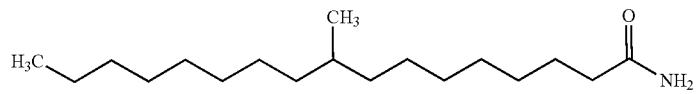 [SMILES: CCCCCCCCC(C)CCCCCCCC(N)=O] | Croda |
| Additive Concentrate A | 4 wt % erucamide (linear unsaturated fatty acid amide), 4 wt % behenamide (linear saturated fatty acid amide), and 10 wt % Talc Concentrate dispersed in DOW ™ LDPE 722 (LDPE) Behenamide molecular weight = 339.608 g/mol Erucamide molecular weight = 337.592 g/mol Erucamide has the following structure:<br>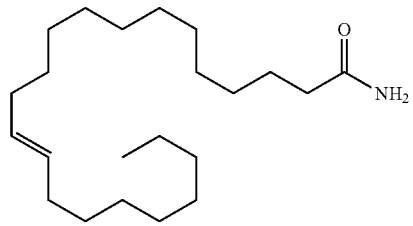 [SMILES: CCCCCCCC/C=C/CCCCCCCCCCCC(N)=O] | The Dow Chemical Company |
| Additive Concentrate B | 4 wt % INCROSLIP ™ SL, 4 wt % behenamide (linear saturated fatty acid amide), and 10 wt % Talc Concentrate dispersed in DOW ™ LDPE 722 (LDPE) Behenamide molecular weight = 339.608 g/mol | The Dow Chemical Company |

Coextruded 3-Layer Blown Film

Coextruded 3-layer blown film samples are prepared using the materials of Table 1 using a LabTech 5 layer blown film line. The line is equipped with two 25 mm single screw extruders, three 20 mm single screw extruders, and a 75 mm die. Total film thickness is set to 2 mils (50 μm).

The resulting coextruded 3-layer film samples each has the following Structure (A):

sealant layer/core layer/substrate layer A       Structure (A).

Each coextruded film sample has a thickness of 50 μm, and the thickness of each layer has a ratio of 1:1:1. Thus, the sealant layer, the core layer, and the substrate layer A each has a thickness of about 16.67 μm.

The sealant layer of Comparative Sample 1 (CS 1) contains 100% DOWLEX™ 2045.11G. The sealant layer of Comparative Sample 2 (CS 2) contains a blend of 97 wt % DOWLEX™ 2045G and 3 wt % Additive Concentrate A, based on the total weight of the sealant layer. The sealant layer of Example 3 (Ex 3) contains a blend of 97 wt % DOWLEX™ 2045G and 3 wt % Additive Concentrate B, based on the total weight of the sealant layer.

The blow up ratio is set to 3.0 and a frost line height of 10 inches is maintained. No internal cooling is employed. A 13.9 inch wide and 200 feet long roll of collapsed bubble is made, which is corona-treated on the substrate layer A side to get surface energy of greater than 42 mN/m. The bubble is slit to make two 12 inch wide rolls. The layer configurations are provided below in Table 2.

Each film sample is tested for Pre-Lamination COF. The results are reported in Table 2.

Laminate

The corona-treated 3-layer blown film samples having the Structure (A) are laminated to a 12 μm (48 mil) thick biaxially oriented PET film (BOPET film) on a Labo Combi™ 400 laminator using MOR-FREE™ L705/C-79 (a solvent-less polyurethane adhesive available from Rohm and Haas), with the L705 and C-79 mixed at a weight ratio of 100:42. Prior to adhesive application, the substrate layer A side is dosed with 0.6 kW corona to clean the surface. The adhesive is applied using a Gravure roll at a surface density of 1.8 g/m², and subsequently nipped at 60° C. The adhesive is cured at 25° C. and 50% relative humidity for at least 7 days.

The resulting laminates have the following Structure (B):

BOPET film substrate layer B/adhesive layer/substrate layer A/core layer/sealant layer    Structure (B).

The laminate samples are tested for Laminate 60° C. Aged COF. The results are reported in Table 2. In Table 2, "CS" refers to Comparative Sample.

TABLE 2

|  | CS 1 | CS 2 | Ex. 3 |
|---|---|---|---|
| Sealant Layer[1] | | | |
| DOWLEX ™ 2045.11G (wt %)[2] (contains 0.12 wt % linear unsaturated fatty acid amide and 0.30 wt % inorganic antiblock) | 100 | — | — |
| DOWLEX ™ 2045G (wt %)[2] | — | 97 | 97 |
| Erucamide (wt %)[2] (from Additive Concentrate A) | — | 0.12 | — |
| Behenamide (wt %)[2] (from Additive Concentrate A or Additive Concentrate B) | — | 0.12 | 0.12 |
| INCROSLIP ™ SL (wt %)[2] (from Additive Concentrate B) | — | — | 0.12 |
| Talc (wt %)[2] (from Additive Concentrate A or Additive Concentrate B) | — | 0.15 | 0.15 |
| DOW ™ LDPE 722 (wt %)[2] (from Additive Concentrate A or Additive Concentrate B) | — | 2.46 | 2.46 |
| DOWLEX ™ Carrier Resin (wt %)[2] (from Additive Concentrate A or Additive Concentrate B) | — | 0.15 | 0.15 |
| Core Layer[4] | | | |
| DOWLEX ™ 2045G (wt %)[3] | 80 | 80 | 80 |
| AGILITY ™ 1001 (wt %)[3] | 20 | 20 | 20 |
| Substrate Layer A[5] | | | |
| DOWLEX ™ 2045G (wt %)[6] | 80 | 80 | 80 |
| AGILITY ™ 1001 (wt %)[6] | 20 | 20 | 20 |
| Adhesive Layer | | | |
| MOR-FREE ™ 705/C-79 (wt %)[7] | 100 | 100 | 100 |
| PET Film Substrate Layer B[8] | | | |
| Biaxially Oriented PET (wt %)[9] | 100 | 100 | 100 |
| Properties: | | | |
| Pre-Lamination COF | 0.166 | 0.139 | 0.082 |
| Laminate 60° C. Aged COF | 0.674 | 0.406 | 0.224 |

[1] The sealant layer is formed from the 3-layer film described above. The sealant layer has a thickness of about 16.67 μm.
[2] Based on the total weight of the sealant layer.
[3] Based on the total weight of the core layer.
[4] The core layer is formed from the 3-layer film described above. The core layer has a thickness of about 16.67 μm.
[5] The outer layer is formed from the 3-layer film described above. The outer layer has a thickness of about 16.67 μm.
[6] Based on the total weight of the substrate layer A.
[7] The adhesive layer is formed from MOR-FREE ™ 705/C-79, having a dried coat weight of 1.8 g/m². Weight percent is based on the total weight of the adhesive layer.
[8] The BOPET film substrate layer B has a thickness of 12 μm.
[9] Based on the total weight of the PET film substrate layer B.

The sealant layer of Ex. 3 contains 0.12 wt % INCROSLIP™ SL, based on the total weight of the sealant layer. INCROSLIP™ SL includes a blend of branched saturated fatty acid amides and linear saturated fatty acid amides, each having chain lengths of $C_{14}$, $C_{16}$, and $C_{18}$ in a molar ratio of $C_{14}$:$C_{16}$:$C_{18}$ of 6:5:89. The $C_{18}$ fraction has a branched saturated fatty acid amide:linear saturated fatty acid amide molar ratio of 50:50. The $C_{18}$ branched saturated fatty acid fraction includes isooctadecanamide. In other words, the sealant layer of Ex. 3 contains from 0.048 wt % to 0.120 wt % isooctadecanamide, based on the total weight of the sealant layer. The weight ratio of branched fatty acid amide to linear saturated fatty acid amide in the sealant layer of Ex. 3 is from 1:4 to 1:1.

CS 1 is a comparative laminate with an adhesive layer, a BOPET film substrate layer, and a film with a sealant layer containing (A) an ethylene-based polymer (DOWLEX™ 2045.11G) and (B) a linear unsaturated fatty acid amide—and no branched fatty acid amide and no linear saturated fatty acid amide. CS 1 exhibits a high Laminate 60° C. Aged COF of 0.674.

CS 2 is a comparative laminate with an adhesive layer, a BOPET film substrate layer, and a film with a sealant layer containing (A) an ethylene-based polymer (DOWLEX™ 2045G), (B) a linear unsaturated fatty acid amide (erucamide), and (C) linear saturated fatty acid amide (behenamide)—and no branched fatty acid amide. CS 2 exhibits a high Laminate 60° C. Aged COF of 0.406.

Applicant surprisingly found that a laminate with an adhesive layer, a BOPET film substrate layer, and a film with a sealant layer containing (A) an ethylene-based polymer (DOWLEX™ 2045G); (B) a branched fatty acid amide (INCROSLIP™ SL, which contains isooctadecanamide); and (C) linear saturated fatty acid amide (behenamide), the branched fatty acid amide and the linear saturated fatty acid amide having a weight ratio of from 1:5 to 3:1 (Ex. 3) advantageously exhibits a Pre-Lamination COF of 0.082 and a low Laminate 60° C. Aged COF of 0.224.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A multilayer film comprising at least two layers comprising:
    a sealant layer comprising
        (A) a first ethylene-based polymer having a density from 0.895 g/cc to 0.925 g/cc and a melt index from 0.5 g/10 min to 30 g/10 min;
        (B) a branched fatty acid amide;
        (C) a linear saturated fatty acid amide, wherein the branched fatty acid amide and the linear saturated fatty acid amide have a weight ratio of from 1:5 to 3:1; and
    a second layer in contact with the sealant layer, the second layer comprising a second ethylene-based polymer.

2. The multilayer film of claim 1, wherein the branched fatty acid amide is a branched saturated fatty acid amide.

3. The multilayer film of claim 1, wherein the branched fatty acid amide is isooctadecanamide.

4. The multilayer film of claim 1, wherein the linear saturated fatty acid amide is selected from the group consisting of behenamide, palmitamide, stearamide, and combinations thereof.

5. The multilayer film of claim 1, wherein the first ethylene-based polymer is selected from the group consisting of an ethylene homopolymer, an ethylene/α-olefin copolymer, and combinations thereof.

6. The multilayer film of claim 1, wherein the sealant layer comprises from 0.01 wt % to 1.0 wt % of a combined amount of the branched fatty acid amide and the linear saturated fatty acid amide, based on the total weight of the sealant layer.

7. A laminate comprising the multilayer film of claim 1.

8. A laminate comprising:
    a first film comprising a sealant layer comprising:
        (A) a first ethylene-based polymer having a density from 0.895 g/cc to 0.925 g/cc and a melt index from 0.5 g/10 min to 30 g/10 min;
        (B) a branched fatty acid amide;
        (C) a linear saturated fatty acid amide, the branched fatty acid amide and the linear saturated fatty acid amide having a weight ratio of from 1:5 to 3:1; and
    a second film, wherein the first film is laminated to the second film.

9. The laminate of claim 8, wherein the branched fatty acid amide is a branched saturated fatty acid amide.

10. The laminate of claim 8, wherein the branched fatty acid amide is isooctadecanamide.

11. The laminate of claim 8, wherein the linear saturated fatty acid amide is selected from the group consisting of behenamide, palmitamide, stearamide, and combinations thereof.

12. The laminate of claim 8, wherein the sealant layer has a laminate coefficient of friction (COF) from 0.01 to less than 0.3.

13. The laminate of claim 8, wherein the second film comprises a substrate layer comprising a component selected from the group consisting of a second ethylene-based polymer, a propylene-based polymer, polyamide, polyester, ethylene vinyl alcohol copolymer, polyethylene terephthalate, ethylene vinyl acrylate copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacrylic acid, maleic anhydride grafted ethylene-based polymer, a metal foil, and combinations thereof.

14. The laminate of claim 8, further comprising a third film, wherein the third film is laminated to the second film.

* * * * *